US011663263B2

(12) United States Patent
Pankanti et al.

(10) Patent No.: US 11,663,263 B2
(45) Date of Patent: May 30, 2023

(54) SECURE MATCHING AND IDENTIFICATION OF PATTERNS

(71) Applicant: International Business Machines Corporation, Armonk, NY (US)

(72) Inventors: Sharathchandra Pankanti, Darien, CT (US); Karthik Nandakumar, Singapore (SG); Nalini K. Ratha, Yorktown Heights, NY (US); Shai Halevi, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/740,498

(22) Filed: May 10, 2022

(65) Prior Publication Data
US 2022/0269717 A1 Aug. 25, 2022

Related U.S. Application Data

(62) Division of application No. 16/787,211, filed on Feb. 11, 2020, now Pat. No. 11,321,382.

(51) Int. Cl.
*G06F 16/51* (2019.01)
*H04L 9/00* (2022.01)
*H04L 9/08* (2006.01)

(52) U.S. Cl.
CPC .............. *G06F 16/51* (2019.01); *H04L 9/008* (2013.01); *H04L 9/0866* (2013.01)

(58) Field of Classification Search
CPC ....... G06F 16/51; H04L 9/008; H04L 9/0866; H04L 9/14
See application file for complete search history.

(56) References Cited

U.S. PATENT DOCUMENTS 9,009,089 B1   4/2015  El Defrawy et al.
10,936,744 B1 * 3/2021  Trepetin ............... H04L 9/0861
(Continued)

FOREIGN PATENT DOCUMENTS

| CN | 103744976 A | 4/2014 |
| CN | 106953722 A | 7/2017 |
| CN | 108449309 A | 8/2018 |
| CN | 108494786 A | 9/2018 |
| WO | 2018080857 A1 | 5/2018 |

OTHER PUBLICATIONS

Adriana López-Alt, Eran Tromer, and Vinod Vaikuntanathan, "On-the-fly multiparty computation on the cloud via multikey fully homomorphic encryption", Proceedings of the forty-fourth annual ACM symposium on Theory of computing, ACM, 2012.
(Continued)

*Primary Examiner* — Carl G Colin
*Assistant Examiner* — Hany S. Gadalla
(74) *Attorney, Agent, or Firm* — Harrington & Smith

(57) ABSTRACT

A framework is provided in which a querying agency can request (via a query entity) encrypted data through a service provider from a data owning agency that stores encrypted data. The framework uses homomorphic encryption. The data may be gallery entities, and each of the elements in the framework operate on doubly-encrypted information. The service provider compares a representation of an encrypted query entity from the querying agency and representations of encrypted gallery entities from the data owning agency, resulting in doubly-encrypted values of a metric between corresponding compared representations. The querying agency gets result(s), based on the metric, which indicate whether it is probable the service provider has data similar to or the same as query data in the query entity. The elements have to perform communication in order for the querying agency or the data owning agency to get cleartext information corresponding to the query entity.

20 Claims, 11 Drawing Sheets

(56) References Cited

U.S. PATENT DOCUMENTS

| | | | |
|---|---|---|---|
| 11,436,351 B1* | 9/2022 | Abraham | ............... H04L 9/008 |
| 2009/0313463 A1 | 12/2009 | Pang et al. | |
| 2012/0159180 A1 | 6/2012 | Chase et al. | |
| 2015/0269331 A1 | 9/2015 | Bolanos | |
| 2020/0036512 A1 | 1/2020 | Vaikuntanathan | |
| 2020/0151356 A1* | 5/2020 | Rohloff | ............... G06F 21/6227 |
| 2020/0228307 A1* | 7/2020 | Cheon | ................... H04L 9/3093 |
| 2020/0374100 A1 | 11/2020 | Georgieva | |
| 2021/0089571 A1* | 3/2021 | Perone | ................ G06K 9/6289 |
| 2021/0119792 A1 | 4/2021 | Bastable | |
| 2021/0336792 A1 | 10/2021 | Agrawal | |
| 2022/0311621 A1* | 9/2022 | Uchida | ................ H04L 9/3236 |

OTHER PUBLICATIONS

Cheon, Jung Hee, et al., "Numerical Methods for Comparison on Homomorphically Encrypted Numbers", IACR Cryptology ePrint Archive 2019 (2019): 417.

Y. Elmehdwi, B. K. Samanthula and W. Jiang, "Secure k-nearest neighbor query over encrypted data in outsourced environments," 2014 IEEE 30th International Conference on Data Engineering, Chicago, IL, 2014, pp. 664-667.

Patranabis, Sikhar, et al. "Efficient Secure k-Nearest Neighbours over Encrypted Data", IBM Research India (2018).

C. Hsu, C. Lu and S. Pei, "Image Feature Extraction in Encrypted Domain With Privacy-Preserving SIFT," in IEEE Transactions on Image Processing, vol. 21, No. 11, pp. 4593-4607, Nov. 2012.

S. Hu, Q. Wang, J. Wang, Z. Qin and K. Ren, "Securing SIFT: Privacy-Preserving Outsourcing Computation of Feature Extractions Over Encrypted Image Data," in IEEE Transactions on Image Processing, vol. 25, No. 7, pp. 3411-3425, Jul. 2016.

Boddeti, Vishnu Naresh. "Secure Face Matching Using Fully Homomorphic Encryption." arXiv preprint arXiv:1805.00577(2018).

Hao Chen and Wei Dai and Miran Kim and Yongsoo Song, "Efficient Multi-Key Homomorphic Encryption with Packed Ciphertexts with Application to Oblivious Neural Network Inference", The 26th ACM Conference on Computer and Communications Security (CCS 2019), DOI: 10.1145/3319535.3363207.

\* cited by examiner

Algorithm 6 MaxIdx$(a_1, a_2, \ldots, a_n; d, d', m, t)$

Input: $n$ distinct numbers $(a_1, a_2, \ldots, a_n)$ with $a_i \in [\frac{1}{2}, \frac{3}{2}), d, d', m, t \in \mathbb{N}$
Output: $(b_1, b_2, \ldots, b_n)$ where $b_i$ is close to 1 if $a_i$ is the largest among $a_j$'s and is close to 0 otherwise (refer Theorem 5)

1:  $inv \leftarrow \text{Inv}\left(\sum_{j=1}^{n} a_j / n; d'\right)$    // Initial 1-norm normalization
2:  for $j \leftarrow 1$ to $n-1$ do
3:    $b_j \leftarrow a_j / n \cdot inv$
4:  end for
5:  $b_n \leftarrow 1 - \sum_{k=1}^{n-1} b_j$
6:  for $i \leftarrow 1$ to $t$ do
7:    $inv \leftarrow \text{Inv}\left(\sum_{j=1}^{n} b_j^m; d\right)$
8:    for $j \leftarrow 0$ to $n-1$ do
9:      $b_j \leftarrow b_j^m \cdot inv$
10:   end for
11:   $b_n \leftarrow 1 - \sum_{k=1}^{n-1} b_j$
12: end for
13: return $(b_1, b_2, \ldots, b_n)$

FIG.6A

Algorithm 2 Sqrt($x$; $d$)

Input: $0 \leq x \leq 1$, $d \in \mathbb{N}$
Output: an approximate value of $\sqrt{x}$ (refer Lemma 2)
1: $a_0 \leftarrow x$
2: $b_0 \leftarrow x - 1$
3: for $n \leftarrow 0$ to $d - 1$ do
4: $\quad a_{n+1} \leftarrow a_n \left(1 - \dfrac{b_n}{2}\right)$
5: $\quad b_{n+1} \leftarrow b_n^2 \left(\dfrac{b_n - 3}{4}\right)$
6: end for
7: return $a_d$

FIG.6B

Algorithm 3 Min($a$, $b$; $d$), Max($a$, $b$; $d$)

Input: $a, b \in [0, 1)$, $d \in \mathbb{N}$
Output: an approximate value of min($a$, $b$) and max($a$, $b$) (refer Theorem 1,2)
1: $x = \dfrac{a+b}{2}$ and $y = \dfrac{a-b}{2}$
2: $z \leftarrow$ Sqrt($y^2$; $d$)
3: return $x - z$ for Min($a$, $b$; $d$)
$\quad\quad\quad x + z$ for Max($a$, $b$; $d$)

FIG.6C

SECURE MATCHING AND IDENTIFICATION OF PATTERNS

BACKGROUND

This invention relates generally to pattern matching and encryption and, more specifically, relates to secure matching and identification of patterns.

This section is intended to provide a background or context to the invention disclosed below.

As enterprises move their data to the cloud for processing their transactions at scale efficiently, there are increasing concerns and regulations related to the data privacy and security. In particular, placing unencrypted data on the cloud may allow others unauthorized access to the data. On the other hand, encrypting the data brings its own challenges, as without the appropriate keys, the service provider on the cloud and hosting the information has ability to determine what is in the encrypted data. In other words, if an enterprise wants to search for information in the encrypted data, unless the enterprise gives the appropriate keys to the service provider (and thereby lessen security), the enterprise would have to perform this searching itself.

SUMMARY

This section is meant to be exemplary and not meant to be limiting.

In an exemplary embodiment, a method includes comparing a representation of an encrypted query entity and representations of one or more encrypted gallery entities. Comparisons between the representation of the encrypted query entity and the representations of the one or more encrypted gallery entities result in doubly-encrypted values of a metric between corresponding compared representations. The representation of the encrypted query entity is homomorphically encrypted using a first secret key and the representations of the one more encrypted gallery entities are homomorphically encrypted using a second secret key, and the comparing is performed in an encrypted domain without decrypting the representations. The method also includes outputting selected one or more of the one or more doubly-encrypted values of the metric.

An additional exemplary embodiment is a computer system. The computer system includes one or more processors and one or more memories including computer program code. The one or more memories and the computer program code are configured to, with the one or more processors, cause the computer system to perform operations comprising: comparing a representation of an encrypted query entity and representations of one or more encrypted gallery entities, wherein comparisons between the representation of the encrypted query entity and the representations of the one or more encrypted gallery entities result in doubly-encrypted values of a metric between corresponding compared representations, wherein the representation of the encrypted query entity is homomorphically encrypted using a first secret key and the representations of the one more encrypted gallery entities are homomorphically encrypted using a second secret key, and the comparing is performed in an encrypted domain without decrypting the representations; and outputting selected one or more of the one or more doubly-encrypted values of the metric.

A further exemplary embodiment is a computer program product comprising a computer readable storage medium having program instructions embodied therewith. The program instructions are executable by a computer system to cause the computer system to perform operations comprising: comparing a representation of an encrypted query entity and representations of one or more encrypted gallery entities, wherein comparisons between the representation of the encrypted query entity and the representations of the one or more encrypted gallery entities result in doubly-encrypted values of a metric between corresponding compared representations, wherein the representation of the encrypted query entity is homomorphically encrypted using a first secret key and the representations of the one more encrypted gallery entities are homomorphically encrypted using a second secret key, and the comparing is performed in an encrypted domain without decrypting the representations; and outputting selected one or more of the one or more doubly-encrypted values of the metric.

Another exemplary embodiment is a method. The method includes sending by a first computer system a query comprising a representation of an encrypted query entity toward a second computer system, wherein the representation of the encrypted query entity is homomorphically encrypted using a first homomorphic encryption scheme that uses a first secret key. The method includes receiving, at the first computer system and from the second computer system, one or more doubly-encrypted values indicating values of a metric used by the second computer system to compare representations of one or more encrypted gallery entities with the representation of the encrypted query entity, wherein the one or more doubly-encrypted values are encrypted using both the first homomorphic encryption scheme and a second homomorphic encryption scheme that uses a second secret key. The method further includes decrypting by the first computer system the one or more doubly-encrypted values to create corresponding one or more first partially decrypted values that are decrypted in the first homomorphic encryption scheme. The method also includes receiving at the first computer system one or more second partially decrypted values from a third computer system, wherein the one or more second partially decrypted values correspond to individual ones of the doubly-encrypted values but are decrypted in the second homomorphic encryption scheme. The method additional includes performing by the first computer system merges for individual ones of corresponding first and second partially decrypted values to form cleartext values, the cleartext values providing values corresponding to the metric and indicating how well corresponding representations of encrypted gallery entities are deemed to match representations of the encrypted query entities.

A further exemplary embodiment is an exemplary apparatus that includes one or more processors and one or more memories including computer program code. The one or more memories and the computer program code are configured to, with the one or more processors, cause the apparatus to perform operations comprising: sending by a first computer system a query comprising a representation of an encrypted query entity toward a second computer system, wherein the representation of the encrypted query entity is homomorphically encrypted using a first homomorphic encryption scheme that uses a first secret key; receiving, at the first computer system and from the second computer system, one or more doubly-encrypted values indicating values of a metric used by the second computer system to compare representations of one or more encrypted gallery entities with the representation of the encrypted query entity, wherein the one or more doubly-encrypted values are encrypted using both the first homomorphic encryption scheme and a second homomorphic encryption scheme that uses a second secret key; decrypting by the first computer system the one or more doubly-encrypted values to create corresponding one or more first partially decrypted values that are decrypted in the first homomorphic encryption scheme; receiving at the first computer system one or more second partially decrypted values from a third computer system, wherein the one or more second partially decrypted values correspond to individual ones of the doubly-encrypted values but are decrypted in the second homomorphic encryption scheme; and performing by the first computer system merges for individual ones of corresponding first and second partially decrypted values to form cleartext values, the cleartext values providing values corresponding to the metric and indicating how well corresponding representations of encrypted gallery entities are deemed to match representations of the encrypted query entities.

A computer program product is an additional exemplary embodiment. The computer program product comprises a computer readable storage medium having program instructions embodied therewith, the program instructions executable by a computer system to cause the computer system to perform operations comprising: sending by a first computer system a query comprising a representation of an encrypted query entity toward a second computer system, wherein the representation of the encrypted query entity is homomorphically encrypted using a first homomorphic encryption scheme that uses a first secret key; receiving, at the first computer system and from the second computer system, one or more doubly-encrypted values indicating values of a metric used by the second computer system to compare representations of one or more encrypted gallery entities with the representation of the encrypted query entity, wherein the one or more doubly-encrypted values are encrypted using both the first homomorphic encryption scheme and a second homomorphic encryption scheme that uses a second secret key; decrypting by the first computer system the one or more doubly-encrypted values to create corresponding one or more first partially decrypted values that are decrypted in the first homomorphic encryption scheme; receiving at the first computer system one or more second partially decrypted values from a third computer system, wherein the one or more second partially decrypted values correspond to individual ones of the doubly-encrypted values but are decrypted in the second homomorphic encryption scheme; and performing by the first computer system merges for individual ones of corresponding first and second partially decrypted values to form cleartext values, the cleartext values providing values corresponding to the metric and indicating how well corresponding representations of encrypted gallery entities are deemed to match representations of the encrypted query entities.

Another exemplary embodiment is a method that comprises receiving, at a first computer system and from a second computer system, one or more doubly-encrypted values indicating values of a metric used by the second computer system to compare representations of one or more encrypted gallery entities with a representation of an encrypted query entity. The one or more doubly-encrypted values are encrypted using both a first homomorphic encryption scheme that uses a first secret key and a second homomorphic encryption scheme that uses a second secret key. The method includes decrypting by the first computer system the one or more doubly-encrypted values to create corresponding one or more first partially decrypted values that are decrypted in the second homomorphic encryption scheme. The method also includes outputting the one or more first partially decrypted values that are decrypted in the second homomorphic encryption scheme toward a third computer system.

Another exemplary apparatus includes one or more processors and one or more memories including computer program code. The one or more memories and the computer program code are configured to, with the one or more processors, cause the apparatus to perform operations comprising: receiving, at a first computer system and from a second computer system, one or more doubly-encrypted values indicating values of a metric used by the second computer system to compare representations of one or more encrypted gallery entities with a representation of an encrypted query entity, wherein the one or more doubly-encrypted values are encrypted using both a first homomorphic encryption scheme that uses a first secret key and a second homomorphic encryption scheme that uses a second secret key; decrypting by the first computer system the one or more doubly-encrypted values to create corresponding one or more first partially decrypted values that are decrypted in the second homomorphic encryption scheme; and outputting the one or more first partially decrypted values that are decrypted in the second homomorphic encryption scheme toward a third computer system.

An addition exemplary embodiment is a computer program product comprising a computer readable storage medium having program instructions embodied therewith, the program instructions executable by a computer system to cause the computer system to perform operations comprising: receiving, at a first computer system and from a second computer system, one or more doubly-encrypted values indicating values of a metric used by the second computer system to compare representations of one or more encrypted gallery entities with a representation of an encrypted query entity, wherein the one or more doubly-encrypted values are encrypted using both a first homomorphic encryption scheme that uses a first secret key and a second homomorphic encryption scheme that uses a second secret key; decrypting by the first computer system the one or more doubly-encrypted values to create corresponding one or more first partially decrypted values that are decrypted in the second homomorphic encryption scheme; and outputting the one or more first partially decrypted values that are decrypted in the second homomorphic encryption scheme toward a third computer system.

BRIEF DESCRIPTION OF THE SEVERAL VIEWS OF THE DRAWINGS

FIG. 6A is an illustration of an algorithm used to find the index of the matched identity for homomorphically encrypted numbers;

FIG. 6B is an illustration of an algorithm used to find a square root of two homomorphically encrypted numbers;

FIG. 6C is an illustration of an algorithm used to find values of min(a,b) and max(a,b);

DETAILED DESCRIPTION

Figure 1:
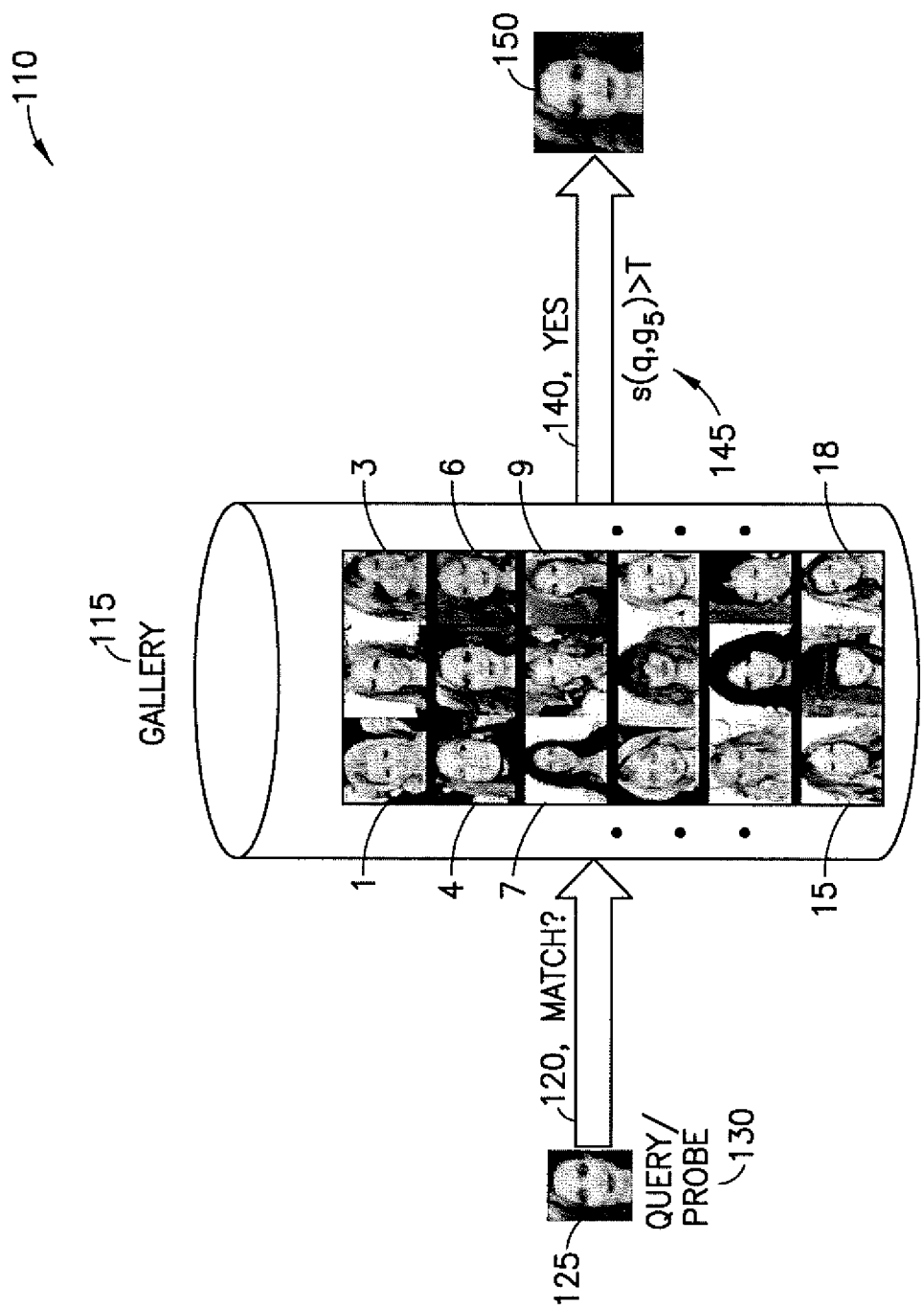
FIG. 1 illustrates matching and identification in plaintext for a gallery of facial images.

The following abbreviations that may be found in the specification and/or the drawing figures are defined as follows:

FHE fully homomorphic encryption
HE homomorphic encryption
I index
I/F interface
MFHE multi-key fully homomorphic encryption
SMC secure multi-party computation
SV similarity value The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, enterprises moving their data to the cloud, e.g., for processing their transactions at scale efficiently, have to address increasing concerns and regulations related to the data privacy and security. Encryption toolsets are one means of transferring the data to cloud while providing concrete guarantees of security and privacy. As previously described, however, placing encrypted data on the cloud or similar storage locations makes searching harder. The techniques provided below provide, in exemplary embodiments, end-to-end encrypted solutions to certain "matching" applications on the cloud or in other suitable locations.

For instance, what an enterprise might like to do is perform matching and identification in plaintext (information that is not encrypted). Consider a useful class of applications called "identification", which involves the following:

1) a pre-populated representation of one or more entities, collectively called a gallery;

2) given a new entity representation (called a query or probe), the system is required to assess which of the gallery entities is most "similar" to the query entity;

3) the assessment includes whether the query entity is sufficiently similar to a gallery entity to determine that a "match" has been found; and 4) the representation can be structured (e.g., "name", ss #) or unstructured (e.g., image).

Example applications include face recognition, license plate recognition, and the like. Regarding face recognition, FIG. 1 illustrates matching and identification in plaintext for a gallery of facial images. In this example, the database 110 might on the cloud and the gallery 115 includes many images of faces, of which images 1 through 18 are shown. The enterprise ends a query 130 (also called a probe) with a corresponding image 125 along with a matching request 120 (illustrated as "Match"). For example, perhaps there is facial security enabled to access employee information, and the enterprise wants to verify that this employee can access employee information.

The assessment that is performed uses the following equation:

$$s(q,g_i) > T, \qquad (1)$$

where:
q: representation of the query entity;
$g_i$: representation of the ith gallery entity;
s: similarity function; and
T: threshold.

In this example, the result is a "Yes" (i.e., there is a match), as indicated by reference 140, and also $s(q, g_5) > T$ (see reference 145), as the fifth image (image 5) matches the input image 125 according to equation (1) above and based on the similarity function s(•). The image 5 is output as indicated by reference 150, possibly with other structured information (e.g., access level, to indicate whether the employee has access to employee information).

Although this provides a benefit to the enterprise, this also means that a lot of personal data, particularly images of employees in this example, are beyond the control of the enterprise. In fact, with regard to the example of facial images, there have been recent privacy concerns on face recognition. One concern involves reporting indicating certain government institutions were found to be using databases for facial recognition searches. In particular, the government organizations were using driver's license photographs. If, however, an enterprise puts facial images as cleartext on to a cloud or other location that might be accessed by anyone, the enterprises risks similar privacy issues.

Furthermore, many regulations have begun to address privacy, and place fines or take other actions for noncompliance with the regulations. For instance, the European Union (EU) General Data Protection Regulation (GDPR) is effective as of 25 May 2018 and imposes heavy fines—up to 4% of annual revenue—on organizations for noncompliance. Many companies operate in regulated industries and handle sensitive data, adding significant costs to operations.

Figure 2:
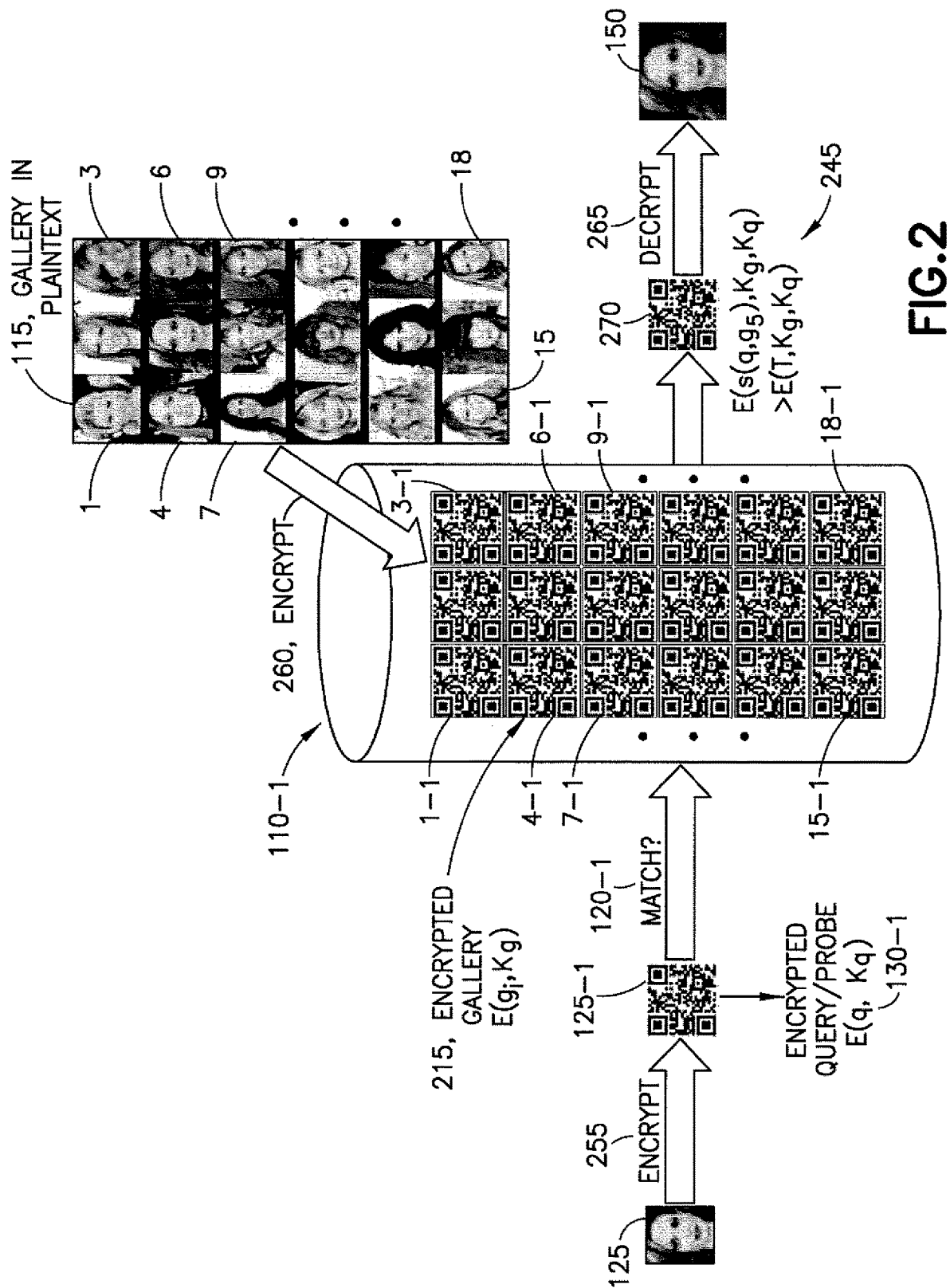
FIG. 2 illustrates matching and identification in an encrypted domain for a gallery of facial images.

In light of concerns like these, it is possible to encrypt data and perform searching on encrypted data. FIG. 2 illustrates matching and identification in an encrypted domain. With respect to FIG. 1, the matching in FIG. 2 is similar to the matching in the clear except the gallery and query entities are encrypted, and the result is available in encrypted format, which needs to be decrypted.

This is illustrated in FIG. 2, where the gallery 115 that is in plaintext (i.e., not encrypted) is encrypted 260 and becomes an encrypted gallery 215 in the database 110-1. The encryption function for the encrypt operation 260 is illustrated as $E(g_i, K_g)$, where E(•) is an encryption function, $g_i$ is a representation of the ith gallery entity, and $K_g$ is a key used for the gallery and used by the encryption function to encrypt the images. The encrypted gallery 215 has encrypted images 1-1 through 18-1, each of which is an encrypted version of a corresponding cleartext image 1 to 18.

Using this system, an enterprise encrypts 255 the input image 125 to create an encrypted input image 125-1. The matching request 120-1 includes an encrypted query (also called a probe) 130-1, which is represented as $E(q, K_q)$, where E(•) is an encryption function, q is a representation of the query entity (e.g., including the encrypted input image 125-1), and $K_g$ is a key used for the query and used by the encryption function to encrypt the query q into the encrypted query 130-1.

The result is an encrypted image 270, which is returned to the enterprise. The result is created using the equation:

$$E(s(q,g_i),K_g,K_g) > E(T,K_g,K_g), \quad (2)$$

where:
q: representation of the query entity;
$g_i$: representation of the ith gallery entity;
s: similarity function;
T: threshold;
E(•): encryption function;
$K_g$: key used to encrypt the gallery; and
$K_q$: key used to encrypt the query.

In this example, the result is $E(s(q, g_5), K_g, K_q)$, as the encrypted fifth image (image 5) 6-1 matches the encrypted input image 125-1 according to the equation (2) above and based on the similarity function s(•). The enterprise would decrypt 265, using the key $K_q$, the result 270 to get the image 5, as indicated by reference 150.

There are two competing interests here: On one hand, the enterprise wants to control access to its data, and particularly private data, such as by using encryption in FIG. 2; On the other hand, some governmental or other agencies can have legitimate reasons to request such data. Thus, one problem is that the enterprise (a data owning agency) wants to control its data, while still allowing an agency (a querying agency) to make queries that are for valid reasons, such as to implement a warrant, to gauge compliance (with a regulation), or for other legitimate reasons.

Figure 3:
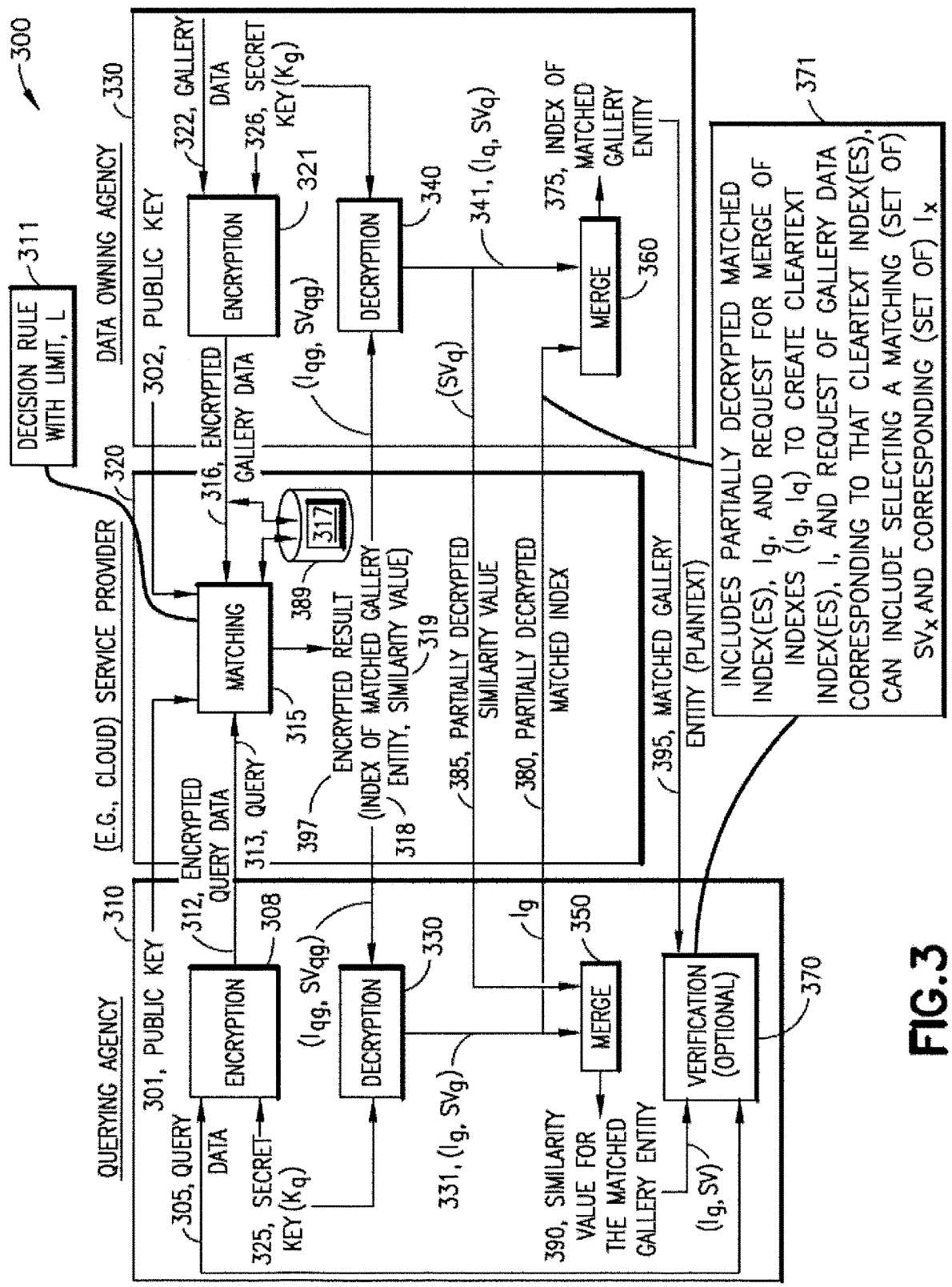
FIG. 3 is a block diagram of an exemplary system suitable for secure matching and identification of patterns, in accordance with in exemplary embodiment.

Exemplary embodiments herein address these issues by providing a framework in which a querying agency, e.g., with a legitimate reason to request data, can request encrypted data through a service provider from a data owning agency that stores encrypted data. FIG. 3 illustrates an exemplary system suitable for secure matching and identification of patterns, in accordance with in exemplary embodiment. This framework allows a querying agency 310 to request matching from a service provider 320 for query data 305. The querying agency 310 gets a result, a similarity value 390, which indicates whether it is probable the service provider 320 has data similar to or the same as the query data 305. Additional verification 370 may be performed, with approval of the data owning agency 330. This is described in more detail below.

As an example, as previously described, the querying agency is allowed in this framework 300 to make queries that are for valid reasons, such as to implement a warrant, to gauge compliance (e.g., with a regulation), or for other legitimate reasons. As one example the querying agency 310 might be the Federal Bureau of Investigation (FBI), while the data owning agency could be another part of the Federal government. The FBI might need to know if a picture they have taken of a person is a wanted person. They can use this limited querying to determine whether the person in the picture really is a wanted person. Note that the verification in block 370 can pass (e.g., the facial images are similar) or fail (e.g., the facial images are not similar, such as being from different people).

Note that the service provider 320 might allow queries from certain organizations, or allow only so many queries over a time period, or place other restrictions on the querying agency. The data owning agency 330 may also provide approval, depending on circumstances, or a court could provide approval for these queries. The restrictions and approval are outside the scope of this disclosure. This disclosure instead provides the framework 300 for such (typically limited) queries to occur on encrypted data.

In additional detail, there are three entities involved in the framework: a querying agency 310; a service provider 320, which may be on the cloud; and a data owning agency 330. The querying agency 310 comprises an encryption process 308, a decryption process 330, and a merge process 350, and may comprise a verification process 370. The service provider 320 comprises a matching process 315. The data owning agency 330 comprises an encryption process 321, a decryption process 340, and a merge process 360. The data owning agency 330 owns the data that is placed with the service provider 320. The querying agency 310 would like to determine if query data 305 is contained within the (e.g., encrypted) database 389.

Figure 3A:
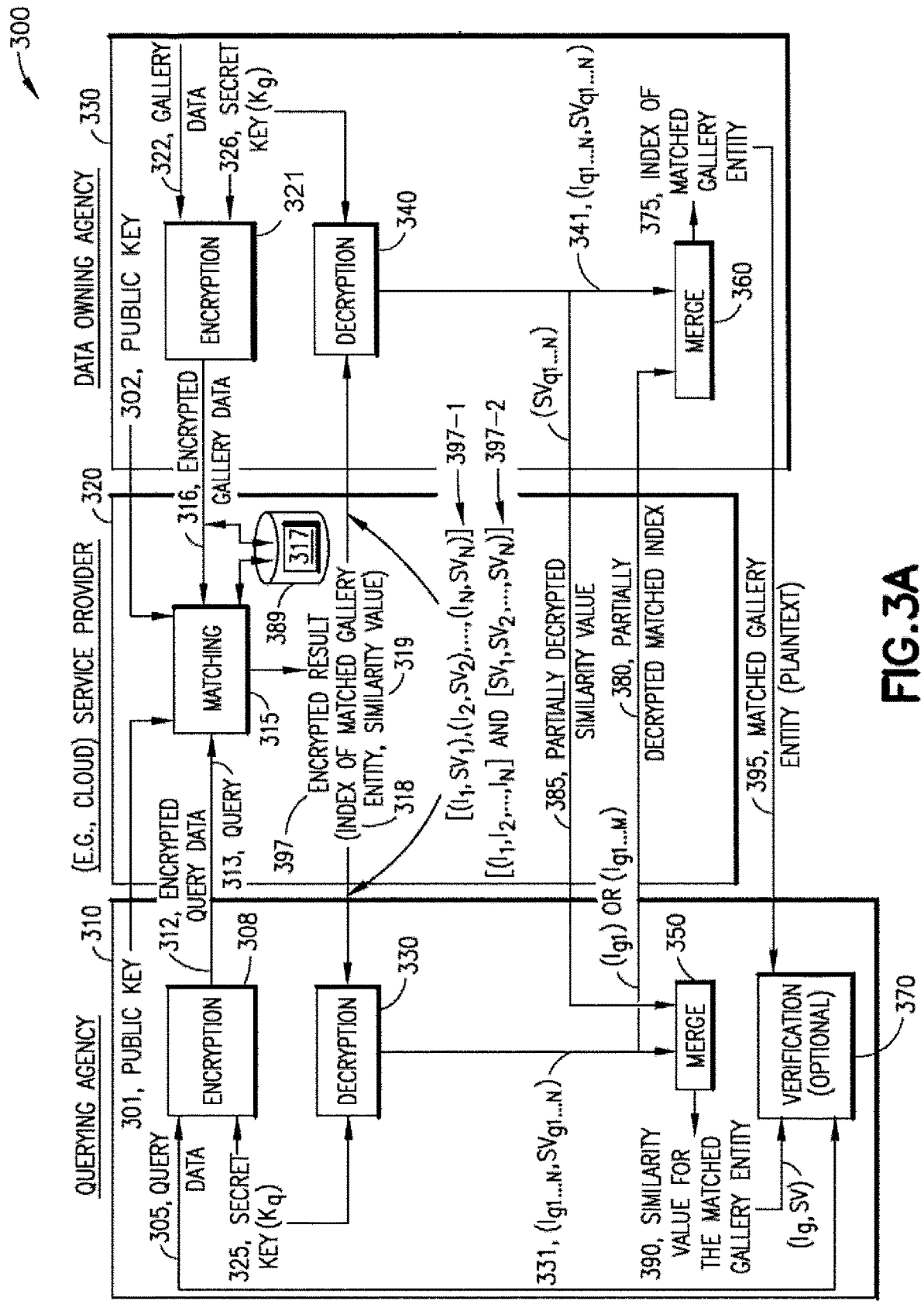
FIG. 3A is a block diagram of another exemplary system suitable for secure matching and identification of patterns, in accordance with an exemplary embodiment.
Figure 4:
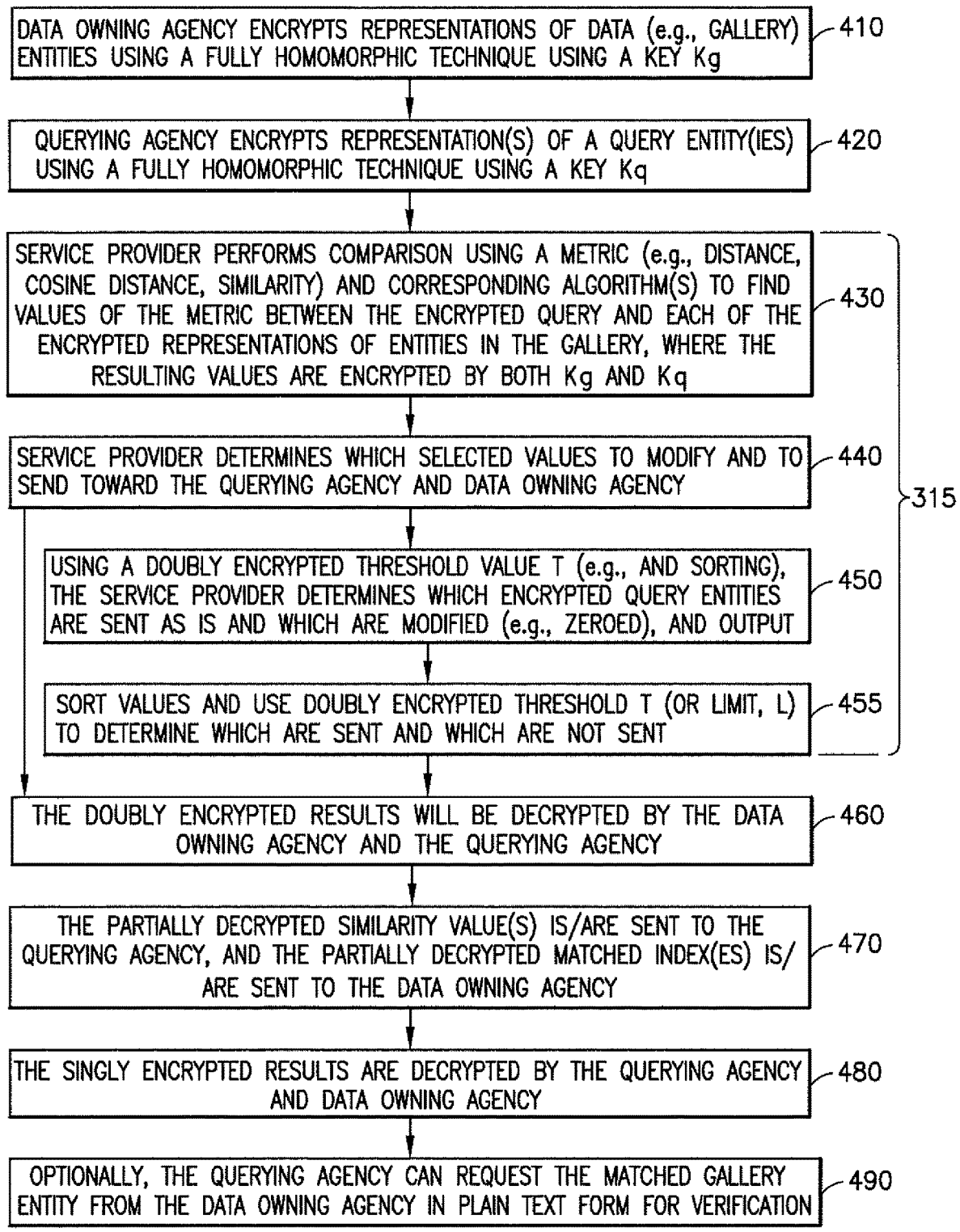
FIG. 4 is a block diagram of a flowchart of an exemplary method for secure matching and identification of patterns, in accordance with in exemplary embodiment.

The operations taken by the entities in FIG. 3 are best explained through an example also involving FIG. 4, which is a block diagram of a flowchart of an exemplary method for secure matching and identification of patterns, in accordance with in exemplary embodiment. Refer to FIGS. 3 and 4 for the following description, where reference numerals of 3XX (where "X" is any integer) are on FIG. 3 (or on FIG. 3A) and reference numerals of 4XX are on FIG. 4.

It is noted that the instant techniques such as in FIGS. 3 and 4 leverage techniques of multi-key fully homomorphic encryption (MFHE) to enable pattern matching within an encrypted domain. For these multi-key techniques see, in particular, see Adriana Lopez-Alt, Eran Tromer, and Vinod Vaikuntanathan, "On-the-fly multiparty computation on the cloud via multikey fully homomorphic encryption", Proceedings of the Forty-Fourth Annual ACM Symposium on Theory of Computing, ACM, 2012.

In block 410, the data owning agency 330 encrypts, using encryption process 321, representations of data (e.g., gallery) entities (e.g., gallery data 322) using a fully homomorphic technique using a secret key $K_g$ 326. It should be noted that whatever can be performed in a fully homomorphic mode, can also be performed in somewhat homomorphic mode, while the contrary might not be not true. The data owning agency 330 sends the resultant encrypted gallery data 316 to the service provider 320. The data owning agency 330 also sends a public key 302 to the service provider 320. The fully homomorphic technique creates both the secret key $K_g$ 326 and the public key 302. It is noted that a gallery of images of faces is used herein as the primary example, but the techniques are not limited to this example. Furthermore, the term "gallery" may encompass a collection of objects or other entities in a database.

It is further noted that the representations may be (for galleries of images) encrypted data of the images in the gallery. It is more likely, however, that the representations are encrypted data of feature vectors of facial information, which can then enable better comparisons. The representations may be received as such feature vectors (as encrypted gallery data 316), although it may be possible to receive the encrypted gallery data 316 as images, and convert these using homomorphic operations to feature vectors. That is, the gallery data 316 is encrypted. Given encrypted images, it is possible to compute the encrypted feature vectors in the homomorphic domain, such that feature vectors can be created from an image or text input homomorphically. The feature vectors can then be stored in the encrypted gallery 317 with the corresponding image, e.g., as metadata for the corresponding images. Similarly, the encrypted query data 312 can also be an encrypted image or encrypted feature vector of an image.

The service provider 320 puts the encrypted gallery data 316 into an encrypted gallery 317 in the database 389. With reference to FIG. 2, the encrypted gallery 317 can be considered to be the encrypted gallery 215, and the database 389 can be considered to be the database 110-1. The encrypted gallery data 316 in the encrypted gallery 317 can be considered to be patterns, as encrypted data is basically a set of binary data forming a pattern, which can then be compared with other patterns as described below.

Figure 5:
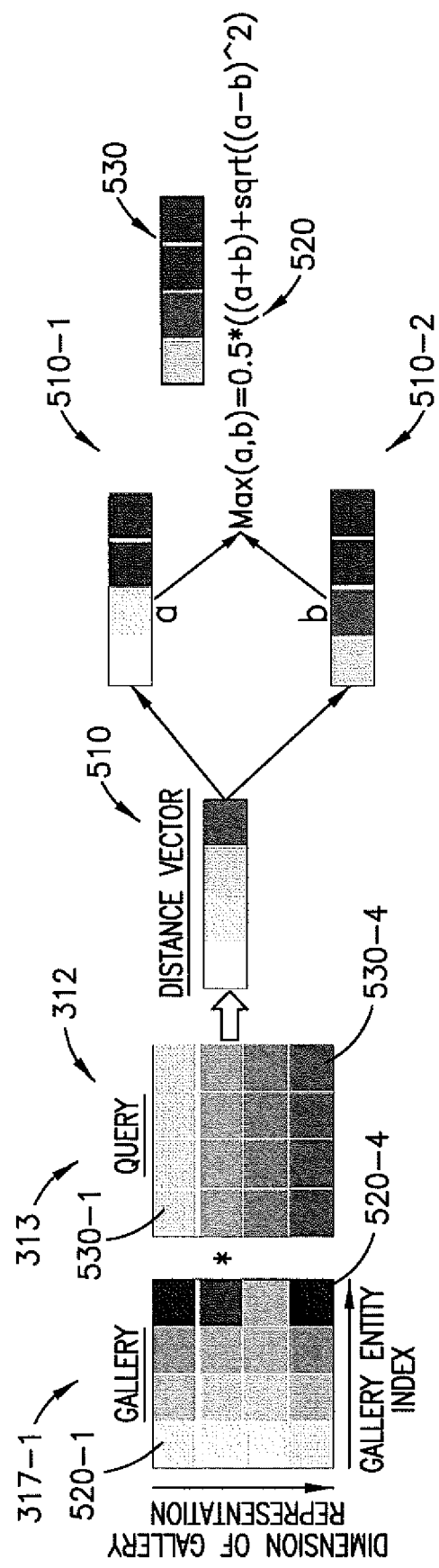
FIG. 5 provides a pictorial illustration of a matching algorithm in accordance with an exemplary embodiment.

In block 420 of FIG. 4, the querying agency 310 encrypts, using the encryption process 308, a representation of a query entity (e.g., query data 305) using a fully homomorphic technique using a key $K_q$ 325. As indicated in FIG. 5, there may be multiple query entities in a query. The querying agency 310 sends the resultant encrypted query data 312, as part of a query (also called a probe) 313 to the service provider 320. The querying agency 310 also sends a public key 301 to the service provider 320. The fully homomorphic technique creates both the secret key $K_q$ 325 and the public key 301.

In response to reception of the encrypted query data 312, the service provider 320 runs the matching process 315. In FIG. 4, the matching process 315 includes the operations in blocks 430 and 440. In block 430, the service provider performs comparisons using a metric (e.g., distance, cosine distance, similarity metric) and corresponding algorithm(s) to find values of the metric between the encrypted query/probe 313 and each of the encrypted representations of entities in the gallery, where the resulting values are encrypted by both $K_g$ and $K_q$. Exemplary algorithms that might be used are illustrated in FIGS. 6A, 6B, and 6C. Note that the service provider 320 is able to perform the distance computation as well as compare the computed distance to a threshold without access to the secret keys $K_g$ and $K_q$. In more detail, the SP (service provider) 320 has gallery data 316 encrypted under key $K_g$ and has query data 312 encrypted under key Kq. When the two inputs to a calculation such as a distance calculation are encrypted using different keys, the output distance will be encrypted by both the keys. One option to achieve this property is to use the method of multi-key homomorphic encryption scheme proposed in Hao Chen et al., "Efficient Multi-Key Homomorphic Encryption with Packed Ciphertexts with Application to Oblivious Neural Network Inference", The 26th ACM Conference on Computer and Communications Security (CCS 2019), DOI: 10.1145/3319535.3363207. More specifically, as described in Section 4 of the above reference, any operation between ciphertexts encrypted using different keys generates an extended ciphertext at the SP (service provider). The public keys 301 and 302 of each party (querying and data owning agencies) can be combined with the corresponding evaluation keys (which is a special encryption of the secret key of each party by itself) to generate a relinearization key for each party. By applying a complex process called relinearization using their respective relinearization keys, the extended ciphertext sent by the SP can be transformed into more traditional ciphertexts by the two parties. These traditional ciphertexts can be decrypted partially by the two parties and finally merged to obtain the final decrypted result of the computation.

The cosine distance is one exemplary distance metric that might be used. Note that the metric being used effectively "ignores" that the data is encrypted. In other words, the metric need not be modified to be used for encrypted data. It is also noted that other "distance" metrics may be used. There are many such metrics, such as Hamming distance metrics. However, various "similarity" metrics and corresponding algorithms may be used instead or possibly additionally. These are similar, but use different scales. For instance, for distance metrics, the smallest distance between multiple items indicates the "best" match between the items, while for similarity metrics, the highest similarity metric indicates the best match. Many other distance measures (e.g., Hamming, Euclidean, Manhattan, Mahalanobis, and the like) or similarity measures (e.g., correlation) may be used.

The service provider 320 in block 440 determines which selected values to modify and to send toward the querying agency 310 and the data owning agency 330. Blocks 430 and 440 are illustrated pictorially in an exemplary embodiment in FIG. 5, described below.

Before proceeding with addition description of FIG. 4, it is helpful to describe possible exemplary processes performed by the service provider 320. First, consider that in n FIG. 3, only a single encrypted result 397 was illustrated, ($I_{qg}$, $SV_{qg}$), where the qg subscript indicates double encryption in accordance with a homomorphic encryption scheme corresponding to secret keys $K_q$ 325 and $K_g$ 326 (e.g., or their corresponding public keys 301, 302). However, the service provider 320 can instead, for reasons described below, produce multiple results 397. This is illustrated also by FIG. 3A, which is a block diagram similar to FIG. 3 of another exemplary system suitable for secure matching and identification of patterns, in accordance with in exemplary embodiment. One such multiple results 397-1 in FIG. 3 is a vector of N indexes and corresponding N similarity values: $[(I_1, SV_1), (I_2, SV_2), \ldots (I_N, SV_N)]$. Another example is multiple results 397-2, which includes a vector of N indexes and a corresponding vector of N similarity values: $[I_1, I_2, \ldots, I_N]$ and $[SV_1, SV_2, \ldots, SV_N]$. An index is information that allows a corresponding similarity value to be uniquely accessed from other similarity values, such as in a database 389. The similarity values also can correspond to images (or feature vectors or however the encrypted gallery data 316 is stored). Additionally, the decryption in block 330 may include decrypting N indexes $I_{g1\ldots N}$ and N similarity values $SV_{g1\ldots N}$. The notation $I_{g1\ldots N}$ is used to save space and is equivalent to $(I_{g1}, I_{g2}, \ldots, I_{gN})$. Similarly, the notation $SV_{g1\ldots N}$ is used to save space and is equivalent to $(SV_{g1}, SV_{g2}, \ldots, SV_{gN})$. Similar notation is used elsewhere in FIG. 3A. For instance, the decryption 340 can decrypt may include decrypting N indexes $I_{q1\ldots N}$ and N similarity values $SV_{q1\ldots N}$.

Second, concerning this process, it is important to understand that the service provider 320 operates fully in the encrypted domain. Therefore, while the service provider 320 can perform a number of computations, and run algorithms and use a threshold (as described below), the service provider does not know the results of these computations.

Consider some simple examples. Suppose that the service provider 320 computes a vector of similarity values $[SV_1, SV_2, SV_3, SV_4, SV_5, SV_6]$ after matching. Assume that a decision rule (see block 311) for step 440 is to send the top two similarity values that are greater than a (doubly-encrypted) threshold T. The service provider can compute max($SV_i$-T, 0) (where max(A,B) selects the maximum value between A and B), sort the results, and mask the entries other than the first two. The decision rule 311 may use a limit referred to herein as L. In the examples 1 and 2 below, L=2. The decision rule 311 and its limit L may be set up by the data owning agency 330, the querying agency 310, and/or the service provider 320. The limit L may be cleartext, or, depending on implementation, a doubly-encrypted value.

Example 1: Assume that $SV_2$, $SV_4$ and $SV_5$ are greater than T, with $SV_2 > SV_5 > SV_4$. In this case, the encrypted similarity vector could be $[SV_2, SV_5, 0, 0, 0, 0]$ and the encrypted index vector would be [2, 5, 0, 0, 0, 0]. These two results will be sent as results 397 to the querying and data owning agencies, respectively. Note that the zero ("0") are actually doubly-encrypted representation of zero. Note also that the value being used would change based on the metric being used, e.g., the distance value might be one ("1") instead of zero.

Example 2: Assume that none of the similarity values are greater than T. In this case, the encrypted similarity vector would be [0, 0, 0, 0, 0, 0] and the encrypted index vector would be [0, 0, 0, 0, 0, 0]. These two results (the first two zeros) will be sent as results 397 to the querying and data owning agencies, respectively.

Note that in both the examples, the service provider has no idea about what is inside the result vectors. Only the querying and data owning agencies can jointly decrypt the results 397.

In the first example, the querying agency 310 will know the top two similarity values and the data owning agency 330 will know the indices of the top two most similar matches. In the second example, both the agencies will know that there were no sufficiently similar matches.

Along these lines, in block 450, which is an example of block 440, the service provider 320, using a doubly-encrypted threshold value T, determines which encrypted query entities are sent as is and which are modified (e.g., zeroed), and outputs the encrypted result 397 to the querying agency 310 and data owning agency 330. It is noted that the "doubly-encrypted threshold" is conceptual. In some implementations, the threshold can be explicitly encrypted using both public keys and used as described here. In other implementations, one can use a plaintext threshold value, but still the result of the comparison will be doubly encrypted. This is due to the properties of FHE schemes.

The encrypted results 397 in this example comprise indexes 318 (e.g., into the database 389) of the corresponding matched gallery entries and also corresponding similarity values 319. A similarity value is an indication of "how similar" the matched gallery entry is to the encrypted query data 312. For instance, one common scale that is used is from zero (not similar) to one (very similar), and the similarity value would be within this range. Other ranges may also be used. Note that the Hao Chen et al. reference ("Efficient Multi-Key Homomorphic Encryption with Packed Ciphertexts with Application to Oblivious Neural Network Inference") also describes exemplary prediction models that might be used as suitable algorithms for the "similarity" determination.

It is important to note, however, that these are not "raw" similarity values, but are instead doubly-encrypted similarity values 319. The querying agency 310 cannot decrypt them without help from the data owning agency 330 and also the querying agency 310. Furthermore, it is important to reiterate that the service provider 320 does not know whether any gallery entity is sufficiently similar to the query because the service provider 320 sees only the doubly-encrypted comparison result 397. Only the querying agency 310 (with help from the data owning agency 330 and the querying agency) can see the result of the comparison in plaintext form. So, the decision to discard or retain the selected gallery entity is not made by the service provider 320. The service provider 320, does use an algorithm and potentially the double encrypted threshold T (or a limit, L, indicating as a number of results to send, which may be used with a decision rule 311), however, to limit the number of results sent.

Thus, although while all results 397 may be sent, a certain subset of the encrypted results 397 could be sent. For instance, assume there are a million images (or feature vectors of images) in the encrypted gallery 317. This could result in an encrypted result 397 that contains one million entries, each entry having an index and a corresponding similarity value. Instead of sending the entire one million entries, the doubly-encrypted threshold T might be used to select which subset is sent, possibly in conjunction with a limit, L (as in examples 1 and 2 above, where the limit L indicates how many are sent) might be used. This is illustrated by block 455, where the similarity values may be sorted based on the metric being used. For instance, if the metric is a similarity metric, the higher numbers are better. Meanwhile, if the metric is a distance metric, the lower numbers are better. The doubly-encrypted threshold T can be used as a cutoff point, to determine which values would be sent. For instance, for a similarity metric, similarity values above the doubly-encrypted threshold T might be sent and values below or equal to the doubly-encrypted threshold T would not be sent from the service provider 320 to the querying agency 310, e.g., and also to the data owning agency 330. Another example uses the limit L, such that the doubly-encrypted threshold T is used to determine which results will or will not be modified, but the limit L and decision rule 311 is used to determine which to send and which to not send. For example, perhaps only the top 10 results (as per the limit L) are sent, and the doubly-encrypted threshold is applied to all results to determine which are modified (e.g., to zero) and which are not modified.

With respect to blocks 430 and 440, one can imagine parameterizing the input and results including the size of the output list, threshold, distance (or other metric) function to be used. This would allow more control over the actions of the service provider 320. Note again, however, that the service provider 320 has information only in encrypted form (thresholds, results list, query, and the like). This information can be decrypted only by either the querying agency 310 or the data owning agency 330 (for information encrypted only by one of these) or by both the querying agency 310 and the data owning agency 330 (for information that is doubly-encrypted or partially decrypted from double encryption). An important part to note is that any partial result cannot be inferred by the service provider 320. Instead, the service provider 320 only applies the encrypted similarity, encrypted threshold, and the like, but has no idea about how many results qualified based on the specified threshold.

In block 460, the doubly-encrypted results 397 will be decrypted by the data owning agency 330 and the querying agency 310. The doubly-encrypted results 397 are decrypted by the data owning agency 330 using the decryption process 340, which uses the secret key $K_g$ 326. This produces a result 341, which includes a partially decrypted index $I_q$ and a partially decrypted similarity value $SV_q$. These are decrypted relative to the secret key $K_g$ 326 but remain encrypted relative to the secret key $K_q$ 325, which is the reason for the "q" subscripts.

The doubly-encrypted results 397 are decrypted by the querying agency 310 using the decryption process 330, which uses the secret key $K_q$ 325. This produces a result 331, which includes a partially decrypted index $I_g$ and a partially decrypted similarity value $SV_g$. These are decrypted relative to the secret key $K_q$ 325 but remain encrypted relative to the secret key $K_g$ 326, which is the reason for the "g" subscripts.

In block 470, the partially decrypted similarity value $SV_q$ 385 is sent from the data owning agency 330 to the querying agency 310, and the partially decrypted matched index $I_g$ 380 is sent from the querying agency 310 to the data owning agency 330.

In block 480, the singly encrypted results 380, 385 are decrypted by the querying agency and data owning agency. In particular, the partially decrypted matched index $I_g$ 380 is decrypted by the data owning agency 330 to create an index 375 of the matched gallery entry, where the index 375 is cleartext. Similarly, the partially decrypted similarity value $SV_q$ 385 is decrypted by the querying agency 310 to create a similarity value 390 for the matched gallery entity, where the similarity value is cleartext.

As a further example, the multiple values being passed by the client (in this case, the querying agency 310) so far are to reflect the client's choices in the threshold and the candidate list size (e.g., as defined by the limit L and the decision rule 311) of the response list in addition to the image. The candidate list size, as per the limit L, defines a size of the encrypted results 397-1, 397-2, for instance. These would be there even in an application like a search. The threshold and candidate list size are used by the service provider 320 to limit the number of responses and that are meaningful to the querying agency 310. For example, a querying agency 310 may be interested in responses that have greater than an 80% match. with only the top five results. Another querying agency may be interested in a threshold greater than 0.5 and a candidate list size of 100. These are applied after the full results are obtained for the encrypted matching.

In the multi-key FHE scheme used herein, a doubly-encrypted ciphertext cannot be decrypted using two successive decryption operations involving the two keys 325, 326. Instead, the way to decrypt a doubly-encrypted ciphertext in multi-key FHE is to partially decrypt them using the two keys individually and then merge the two partially decrypted results to obtain the plaintext. That is why the merge steps 350, 385 are necessary. See, for instance, Section 4.3, "Distributed Decryption", of Hao Chen, et al., "Efficient Multi-Key Homomorphic Encryption with Packed Ciphertexts with Application to Oblivious Neural Network Inference", Cryptology ePrint Archive: Report 2019/524. Section 4.3 of this reference describes one example of distributed decryption using two algorithms of partial decryption and merge. Similar or the same algorithms may be used for the decryption 330, 340 and merge 350, 360 steps herein.

At this point, the querying agency 310 can determine there is a match to the query data 305 in the database 389 and also determine what the similarity value 390 for this match is. Note that the similarity value 390 may not indicate a match. For instance, if a similarity metric is used, zero could indicate not similar, and one could indicate similar. Therefore, a value of 0.15 could indicate there is no match, while a value of 0.95 could indicate a match. Note that the querying agency 310 only has the similarity value 390, but does not have the index 375, and so cannot access the actual gallery data 316 that corresponds to the index. Additionally, even if the querying agency 310 had the index 375 and could access the image corresponding to that index from the encrypted gallery 317, that image is encrypted (as encrypted gallery data 316). Thus, the querying agency 310 only gets limited information about the facial image.

Consequently, as an optional operation, the querying agency 310 can request the matched gallery entity from the data owning agency 330 in plain text form for verification. See block 490. Once the querying agency determines that there is a match, the querying agency 310 is likely to follow-up with a request to the data owning agency 330 (or some other organization) to provide the cleartext data. For example, if the Federal Bureau of Investigation (FBI) finds a match with the database of another federal agency, the FBI may initiate a court or other process to obtain the cleartext data (of only the matched entity) from that agency. That is why it is important for the data owning agency 330 to know the index 375 of the match, so that data owning agency 330 can retrieve the correct data when a follow-up request comes from the querying agency 310. This process is illustrated in FIG. 3, where the matched gallery entity 395, in plaintext, is sent from the data owning agency 330 to the querying agency 310. The querying agency 310 performs a verification process 370 to verify that the matched gallery entity 395 corresponds to the query data 305. This step requires the data owning agency 330 to perform this action, and the approval scheme for this is outside the scope of this disclosure.

The additional verification in block 370 might include (see block 371 of FIG. 3) sending by the querying agency 310 the partially decrypted matched index, $I_g$, (or indexes) and a request for merge of indexes ($I_g$, $I_q$) (or corresponding sets of indexes) to create cleartext index, I, 375 (or multiple ones of these) and request of (cleartext) gallery data 395 corresponding to that cleartext index. Note that this could include the querying agency 310 selecting a "matching" similarity value, $SV_x$, (or a set of these) and a corresponding index Ix (or a set of the same). The matching similarity value or values are based on values for the metric being used, such as a similarity or distance metric. For the example 1 above, the querying agency got the following vectors (as results 397-2): similarity values of [$SV_2$, $SV_5$]; and indexes of [2, 5]. The querying agency 310 could select only the similarity value of $SV_2$ and the index of 2 for sending to the data owning agency 330. If allowed and desirable to the querying agency 310, the agency may send both the similarity values of [$SV_2$, $SV_5$]; and indexes of [2, 5] to the data owning agency 330. The data owning agency 330 would respond, if appropriate, with the corresponding cleartext gallery data 322 for either index 2 or indexes 2 and 5.

FIG. 3A also illustrate similar concepts, where the querying agency 310 can send a request for a single index ($I_{g1}$) to the data owning agency 330, and the data owning 330 can send a corresponding cleartext index 375 and corresponding gallery data 395. In another example, however, the querying agency 310 can send a request for multiple indexes ($I_{g1 \ldots M}$), where $I_{g1 \ldots M}$ means ($I_{g1}, \ldots, I_{gM}$) and M>1, to the data owning agency 330, and the data owning 330 can send M corresponding cleartext indexes 375 and M corresponding gallery data 395 to the querying agency 310.

It is noted that the encrypted gallery data 316 is considered to be images containing facial information in this example. While images are assumed herein, it is possible to apply the framework 300 to other data, such as employee records, e.g., as long as the records have defined characteristics such that they can be compared. In fact, as described immediately below, facial information is typically compared using feature vectors, which are mathematical representations of the features of a face in an image. Thus, comparisons may be between vectors (or even matrices), or anything that can be expressed as a vector (or a matrix) may be used. That is, the technique is general and is not restricted to facial images. Facial images are only an illustrative example.

Turning to FIG. 5, this figure provides a pictorial illustration of a matching algorithm in accordance with an exemplary embodiment. This is an illustration of the operations in, e.g., blocks 430 and 440 of FIG. 4. This figure illustrates a way to pack the numbers so that computations can be performed efficiently. There are many other ways to pack these numbers. Similarly, the query can also be packed in different ways, but still the distances can be obtained as a single vector. FIG. 5 is therefore merely illustrative and not limiting. In the example of FIG. 5, the gallery portion 317-1 includes four image feature vectors 510-1 through 520-4. That is, each column is a feature vector and corresponds to facial information from one image and also a gallery index. The probe 313 in this example illustrates multiple images as encrypted query data 312, where the image feature vectors 530-1 through 530-4 correspond to facial information from different four images.

A distance vector 510 is created for each pair of the feature vectors 520, 530. That is, there would be 16 distance vectors 510. This illustrates the operation in block 430. Note that this can be performed via vector multiplication or, if supported, matrix multiplication.

Two of the distance vectors a 510-1 and b 510-2 are shown, and a determination of the vector having the maximum value between the two is determined as follows (see reference 520 too): Max(a,b)=0.5*((a+b)+sqrt((a−b)^2), which is $$\text{Max}(a, b) = \frac{(a, b)}{2} + \frac{\sqrt{(a-b)^2}}{2}.$$

In this case, the result 530 is the distance vector b 510-2. This illustrates part of block 440 of FIG. 4, to find the maximum similarity value.

To find the index of the matched identity, using for instance the equation in reference 520, a number of algorithms are used. One such algorithm is Algorithm 6: MaxIdx proposed in the following reference: Cheon, Jung Hee, et al., "Numerical Methods for Comparison on Homomorphically Encrypted Numbers", IACR Cryptology ePrint Archive 2019 (2019): 417. FIG. 6A is an illustration of an algorithm used to find the index of the matched identity, in accordance with an exemplary embodiment. FIGS. 6B and 6C are additional illustrations of algorithms from Cheon that might be used. FIG. 6B is an illustration of an algorithm used to find a square root of two homomorphically encrypted numbers. FIG. 6C is an illustration of an algorithm used to find values of min(a,b) and max(a,b), where min(•) finds a minimum value and max(•) finds a maximum value. No modifications need to made for these algorithms, except for the fact the input is doubly encrypted.

Figure 7:
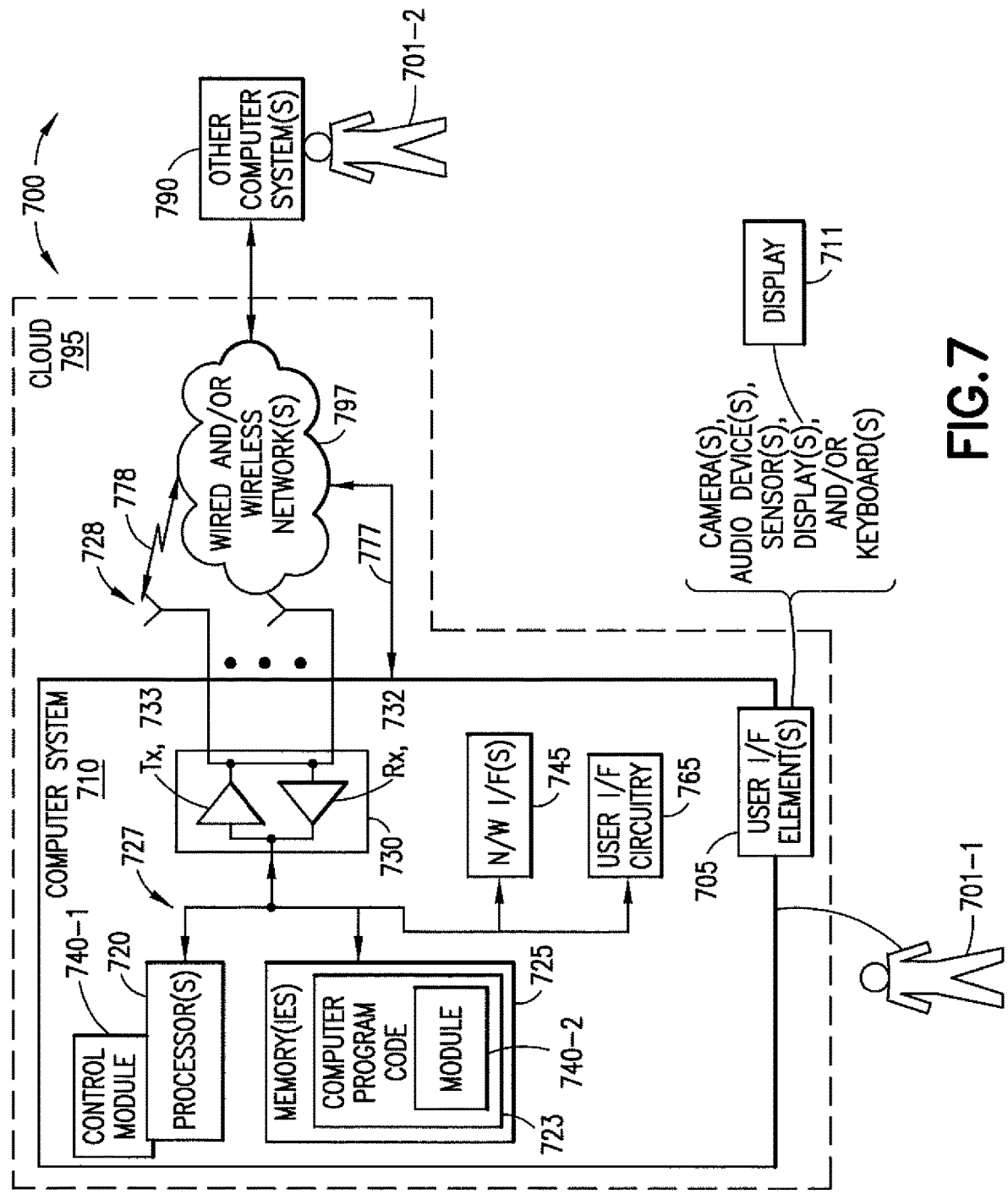
FIG. 7 is a block diagram of one possible and non-limiting exemplary system in which the exemplary embodiments may be practiced.

Turning to FIG. 7, this figure shows a block diagram of one possible and non-limiting exemplary system 700 in which the exemplary embodiments may be practiced. In FIG. 7, a computer system 710 is in wired and/or wireless communication with a wired and/or wireless network(s) 797 and through the network(s) 797 to other computer system(s) 790. The computer system 710 could be accessible over one or more wired or wireless networks 797, could be implemented in the cloud 795, and the like. The computer system 710 could alternatively or additionally be a server, although a client-server relationship is not required.

The computer system 710 includes one or more processors 720, one or more memories 725, one or more transceivers 730, one or more network (N/W) interfaces (I/F(s)) 745, and user interface circuitry 765, interconnected through one or more buses 727. Each of the one or more transceivers 730 includes a receiver, Rx, 732 and a transmitter, Tx, 733. The one or more buses 727 may be address, data, and/or control buses, and may include any interconnection mechanism, such as a series of lines on a motherboard or integrated circuit, fiber optics or other optical communication equipment, and the like. The one or more transceivers 730 are connected to one or more antennas 728 (if a wireless system is used). The one or more memories 725 include computer program code 723.

The computer system 710 includes a control module 740, comprising one of or both parts 740-1 and/or 740-2. The control module 740 performs the operations described herein, such as to implement any operations of the querying agency 310, querying agency 310, or service provider 320 described herein. The control module 740 may be implemented in a number of ways. The control module 740 may be implemented in hardware as control module 740-1, such as being implemented as part of the one or more processors 720. The control module 740-1 may be implemented also as an integrated circuit or through other hardware such as a programmable gate array. In another example, the control module 740 may be implemented as control module 740-2, which is implemented as computer program code 723 and is executed by the one or more processors 720. For instance, the one or more memories 725 and the computer program code 723 may be configured to, with the one or more processors 720, in response to retrieval and execution of the computer program code 723, cause the computer system 710 to perform one or more of the operations as described herein. It should also be noted that the devices shown in the computer system 710 are not limiting and additional, different, or fewer devices may be used.

The user interface circuitry 765 communicates with one or more user interface elements 705, which may be formed integral with the computer system 710 or be outside the computer system 710 but coupled to the computer system 710. The interface elements 705 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. A display 711 is shown, which could be external or internal to the computer system 710. This list is not exhaustive or limiting, and other, different, or fewer elements may be used. A user 701-1 (a human being in this example) may interact with the computer system 710, e.g., to cause the system 710 to take certain actions. These operations may also be caused by the computer system 710, in combination with actions by the user 701-1 or without actions by the user 701-1. The computer system 710 communicates with the other computer system(s) 790 via the one or more wired or wireless networks 797, via one or both of wired link 777 and wireless link 778. Additionally, if the computer system 710 is implemented in the cloud 795, a user 701-2 may interact with the computer system 710 via the wired and/or wireless network(s) 797 and using a computer system 790. In this example, the computer system 790 would have the appropriate user I/F circuitry and user I/F elements (not shown), but would be similar to the user I/F elements 705.

One example is where the computer system 710 is in the cloud 795 and is therefore the cloud service provider 320. The other computer systems 790 would then be the querying agency 310 and the data owning agency 330. The control module 740 would implement the matching process 315 and the other operations previously described as being performed by the service provider 320. In another example, the computer system 710 would be one of the querying agency 310 or service provider 320, and the other computer system 790 would be the service provider 320, e.g., as a server connected via network(s) 797 to the computer system 710.

Figure 8:
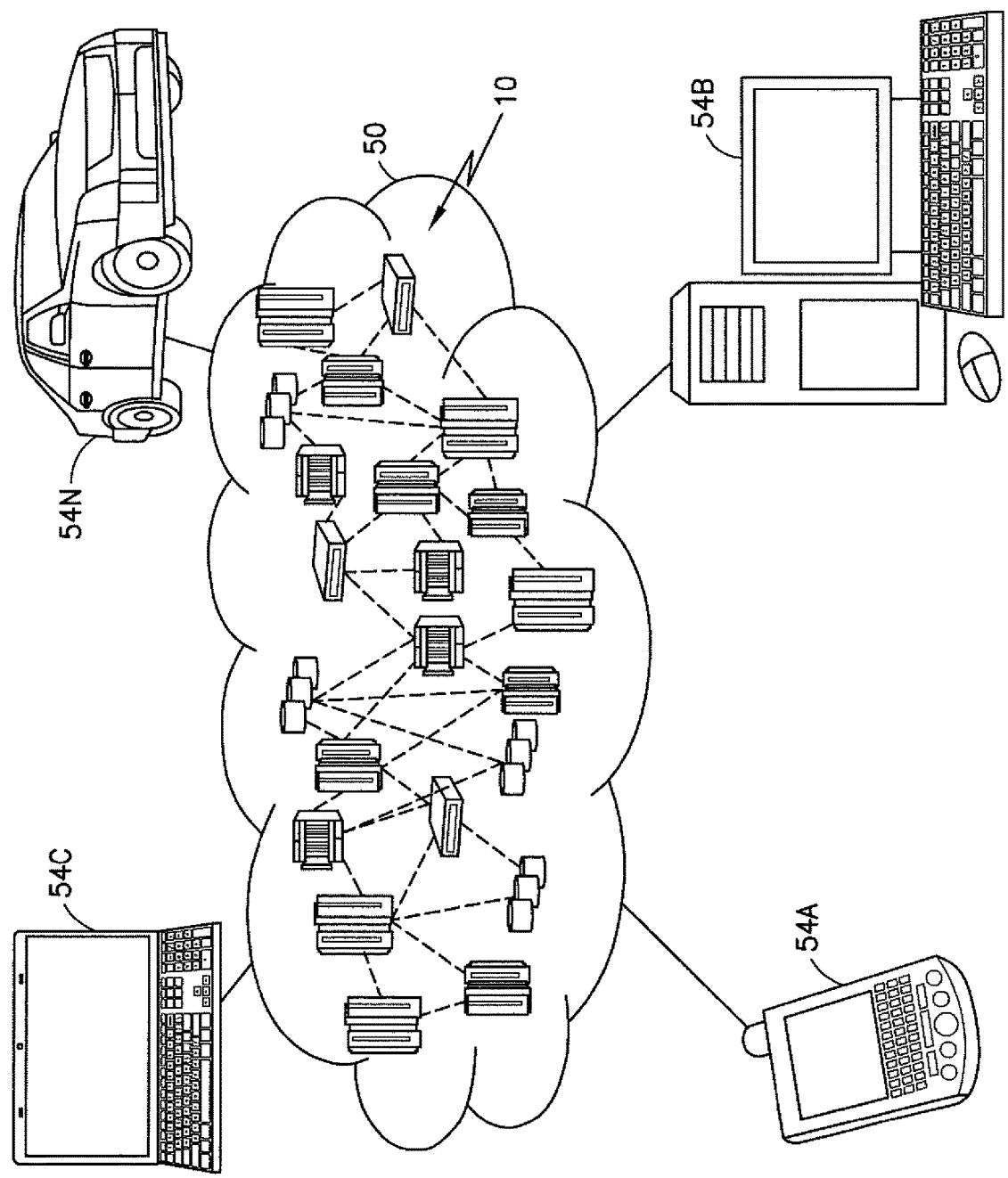
FIG. 8 depicts a cloud computing environment according to an exemplary embodiment.
Figure 9:
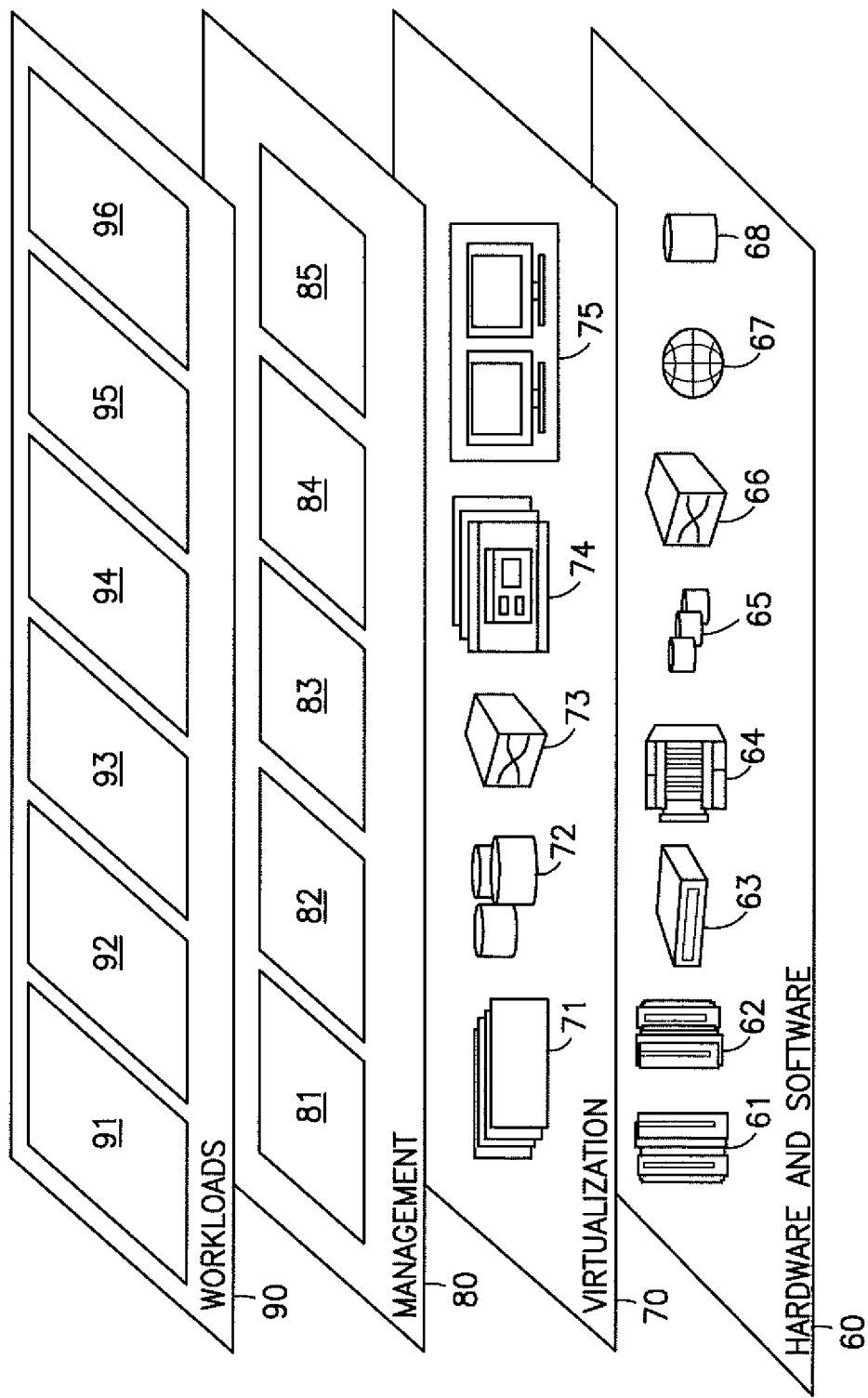
FIG. 9 depicts abstraction model layers according to an exemplary embodiment.

If the service provider 320 is implemented in the cloud 395, FIGS. 8 and 9 provide additional information for cloud implementations. FIG. 8 depicts a cloud computing environment according to an exemplary embodiment, and FIG. 9 depicts abstraction model layers according to an exemplary embodiment.

Referring now to FIG. 8, illustrative cloud computing environment 50 is depicted. Some or all of the cloud computing environment 50 that implements any of the examples herein may be considered to be a computer system 110. Put differently, a computer system 110 may be considered to be a portion of the cloud computing environment 50 that implements any of the examples herein. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a secure matching and identification service 96. The secure matching and identification 96 is a service that implements the examples provided herein, such as implementing the operations of the cloud service provider 320 of FIGS. 2-4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   comparing a representation of an encrypted query entity and representations of one or more encrypted gallery entities, wherein comparisons between the representation of the encrypted query entity and the representations of the one or more encrypted gallery entities result in doubly-encrypted values of a metric between corresponding compared representations, wherein the representation of the encrypted query entity is homomorphically encrypted using a first secret key and the representations of the one more encrypted gallery entities are homomorphically encrypted using a second secret key, and the comparing is performed in an encrypted domain without decrypting the representations; and
   outputting selected one or more of the one or more doubly-encrypted values of the metric.

2. The method of claim 1, wherein there is a single selected one of the one or more doubly-encrypted values of the metric and a corresponding single selected doubly-encrypted index that are output.

3. The method of claim 1, wherein there are multiple selected doubly-encrypted values, and the method further comprises sorting the multiple selected doubly-encrypted values based on the values and, using a doubly-encrypted threshold value T, modifying prior to outputting certain ones of the sorted multiple selected doubly-encrypted values to a selected value that is based on the metric.

4. The method of claim 3, wherein there are doubly-encrypted indexes of corresponding representations for the multiple selected doubly-encrypted values, and the outputting further comprises outputting both certain ones of the sorted the multiple selected doubly-encrypted values and their corresponding doubly-encrypted indexes.

5. The method of claim 3, wherein outputting further comprises outputting only some of certain ones of the sorted multiple selected doubly-encrypted values.

6. The method of claim 1, wherein there are multiple selected doubly-encrypted values, the method further comprises sorting the multiple selected doubly-encrypted values based on the value, and wherein outputting outputs a subset of the sorted multiple selected doubly-encrypted values.

7. The method of claim 6, wherein there are doubly-encrypted indexes of corresponding representations for the multiple selected doubly-encrypted values, and the outputting further comprises outputting both the subset of the multiple selected doubly-encrypted values and their corresponding doubly-encrypted indexes.

8. The method of claim 1, wherein:
   the method is performed by a first computer system;
   the method further comprises receiving a query from a second computer system, the query comprising the representation of the encrypted query entity;

the outputting the selected ones of the doubly-encrypted values is performed from the first computer system toward the second computer system; and the outputting further comprises outputting, by the first computer system and toward a third computer system, the selected ones of the one or more doubly-encrypted values of the metric.

9. The method of claim 1, wherein multiple encrypted representations of query entities are received in a query and the comparing and outputting are performed for the multiple representations of the encrypted query entities.

10. The method of claim 1, wherein the representations of one or more encrypted gallery entities correspond to images comprising faces or to feature vectors of facial information in images.

11. The method of claim 1, wherein the metric comprises one of a distance metric based on cosine distance or a similarity metric.

12. A computer system, comprising:
one or more processors; and
one or more memories including computer program code,
the one or more memories and the computer program code configured to, with the one or more processors, cause the computer system to perform operations comprising:
comparing a representation of an encrypted query entity and representations of one or more encrypted gallery entities, wherein comparisons between the representation of the encrypted query entity and the representations of the one or more encrypted gallery entities result in doubly-encrypted values of a metric between corresponding compared representations, wherein the representation of the encrypted query entity is homomorphically encrypted using a first secret key and the representations of the one more encrypted gallery entities are homomorphically encrypted using a second secret key, and the comparing is performed in an encrypted domain without decrypting the representations; and
outputting selected one or more of the one or more doubly-encrypted values of the metric.

13. The computer system of claim 12, wherein there is a single selected one of the one or more doubly-encrypted values of the metric and a corresponding single selected doubly-encrypted index that are output.

14. The computer system of claim 12, wherein there are multiple selected doubly-encrypted values, and wherein the one or more memories and the computer program code are further configured to, with the one or more processors, cause the computer system to perform sorting the multiple selected doubly-encrypted values based on the values and, using a doubly-encrypted threshold value T, modifying prior to outputting certain ones of the sorted multiple selected doubly-encrypted values to a selected value that is based on the metric.

15. The computer system of claim 14, wherein there are doubly-encrypted indexes of corresponding representations for the multiple selected doubly-encrypted values, and the outputting further comprises outputting both certain ones of the sorted the multiple selected doubly-encrypted values and their corresponding doubly-encrypted indexes.

16. The computer system of claim 12, wherein there are multiple selected doubly-encrypted values, wherein the one or more memories and the computer program code are further configured to, with the one or more processors, cause the computer system to perform sorting the multiple selected doubly-encrypted values based on the value, and wherein outputting outputs a subset of the sorted multiple selected doubly-encrypted values.

17. The computer system of claim 16, wherein there are doubly-encrypted indexes of corresponding representations for the multiple selected doubly-encrypted values, and the outputting further comprises outputting both the subset of the multiple selected doubly-encrypted values and their corresponding doubly-encrypted indexes.

18. The computer system of claim 12, wherein:
the computer system is a first computer system;
the one or more memories and the computer program code are further configured to, with the one or more processors, cause the computer system to perform receiving a query from a second computer system, the query comprising the representation of the encrypted query entity;
the outputting the selected ones of the doubly-encrypted values is performed from the first computer system toward the second computer system; and
the outputting further comprises outputting, by the first computer system and toward a third computer system, the selected ones of the one or more doubly-encrypted values of the metric.

19. The computer system of claim 12, wherein multiple encrypted representations of query entities are received in a query and the comparing and outputting are performed for the multiple representations of the encrypted query entities.

20. A computer program product, comprising a computer readable storage medium having program instructions embodied therewith, the program instructions executable by a computer system to cause the computer system to perform operations comprising:
comparing a representation of an encrypted query entity and representations of one or more encrypted gallery entities, wherein comparisons between the representation of the encrypted query entity and the representations of the one or more encrypted gallery entities result in doubly-encrypted values of a metric between corresponding compared representations, wherein the representation of the encrypted query entity is homomorphically encrypted using a first secret key and the representations of the one more encrypted gallery entities are homomorphically encrypted using a second secret key, and the comparing is performed in an encrypted domain without decrypting the representations; and
outputting selected one or more of the one or more doubly-encrypted values of the metric.

* * * * *